United States Patent
Hermach

[11] Patent Number: 5,782,427
[45] Date of Patent: Jul. 21, 1998

[54] TANDEM-ENGINE AIRCRAFT PROPULSION MODULE

[76] Inventor: Carl J. Hermach, 1100 S. Belcher, #480, Largo, Fla. 34641

[21] Appl. No.: 345,292

[22] Filed: Nov. 28, 1994

[51] Int. Cl.⁶ .................................................. B64C 37/00
[52] U.S. Cl. .................. 244/2; 244/55; 244/120; 244/135 SR
[58] Field of Search .................. 244/2, 254, 55, 244/49, 65

[56] References Cited

U.S. PATENT DOCUMENTS

| | | | |
|---|---|---|---|
| 1,603,711 | 10/1926 | Peck et al. | 244/55 |
| 1,855,652 | 4/1932 | Sanders | 244/55 |
| 1,874,523 | 8/1932 | Henrichsen et al. | 244/55 |
| 2,619,301 | 11/1952 | Hall | 244/2 |
| 2,624,530 | 1/1953 | Hanssen | 244/2 |

*Primary Examiner*—Galen L. Barefoot
*Attorney, Agent, or Firm*—Charles A. McClure

[57] ABSTRACT

Tandem-engine aircraft propulsion module attachable to an aircraft fuselage and/or to the aircraft wings directly. This propulsion module contains fore-and-aft in-line engines and an intermediate fuel compartment. A subhousing of this module has engine instrumentation and controls placed for overhead introduction into an underlying aircraft fuselage cabin when the module is secured on top thereof. Propulsion modules of this invention are readily removable and replaceable for ease of inspection and maintenance, and if like-sized are mutually interchangeable. These modules are inherently economical and enable cost-effective fuselage and dry-wing construction. They also enhance flight safety, not only in comparison with single-engine aircraft but also especially as compared with off-axial twin-engine aircraft.

4 Claims, 7 Drawing Sheets

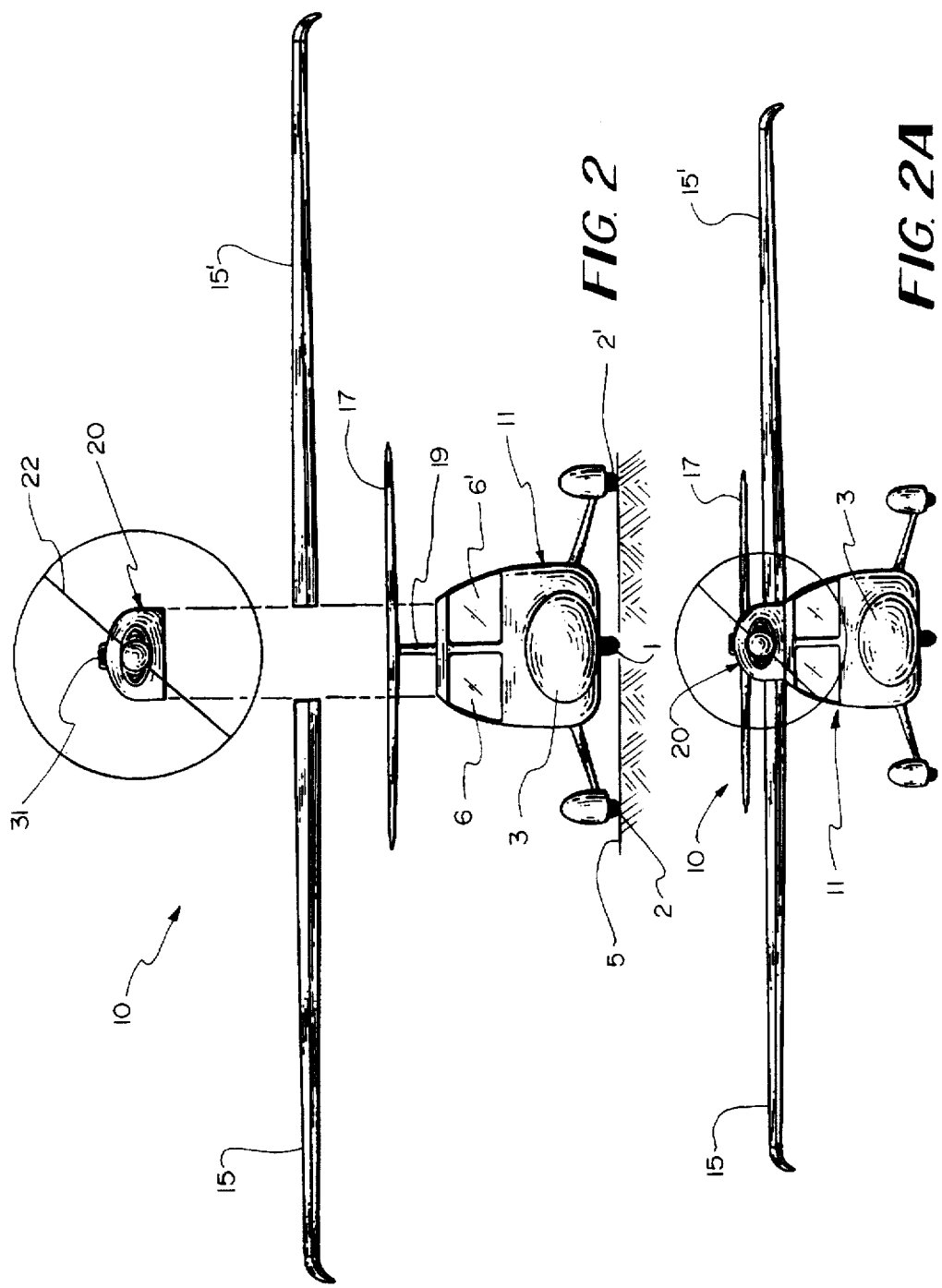

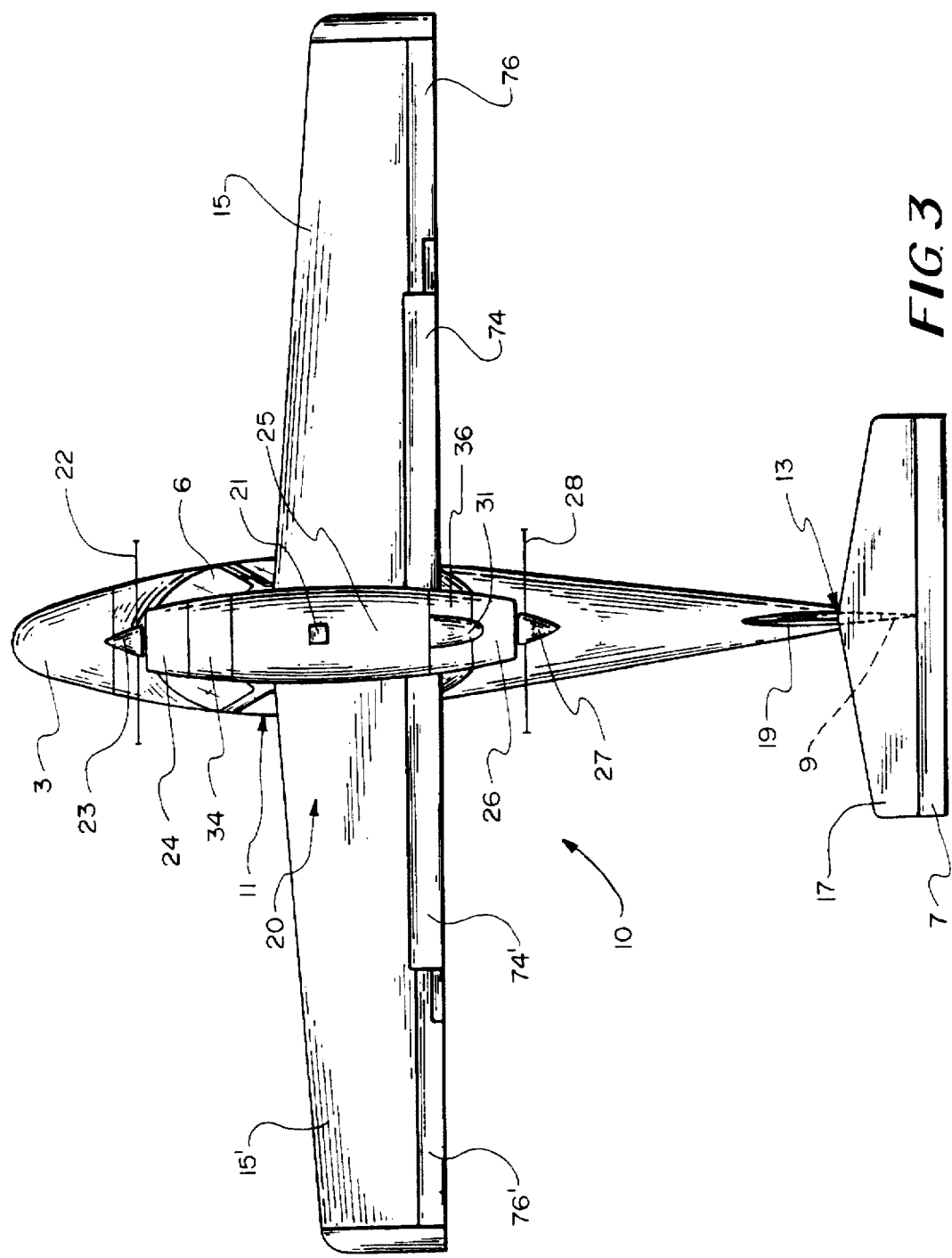

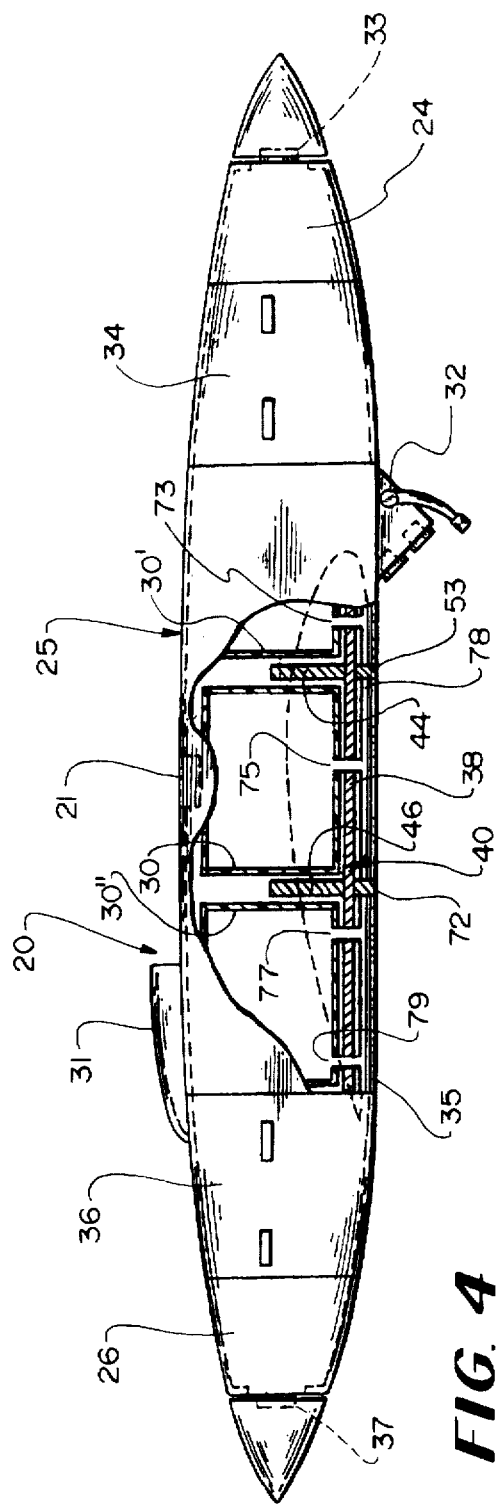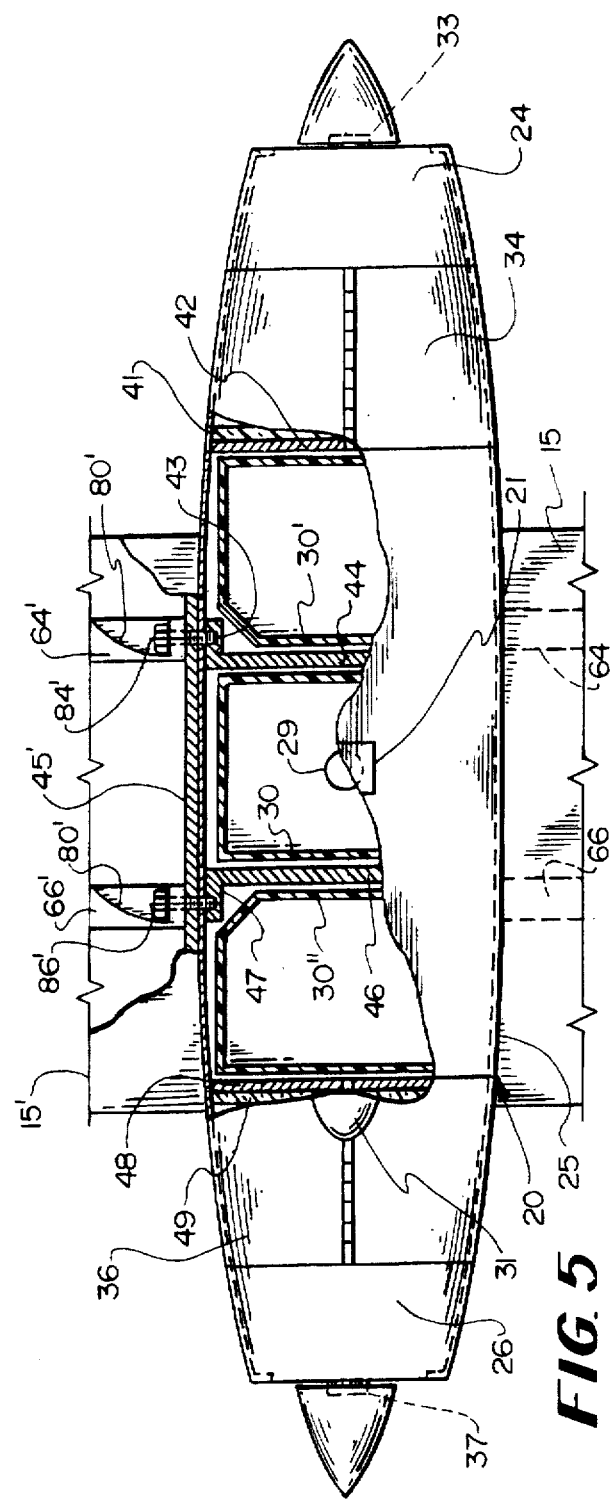

TANDEM-ENGINE AIRCRAFT PROPULSION MODULE

TECHNICAL FIELD

This invention relates to a new propulsion module for aircraft, specifically a tandem-engine aircraft module, and relates also to aircraft equipped with such propulsion module.

BACKGROUND OF THE INVENTION

Manufacturing of non-airline aircraft in the United States has dropped drastically in the past dozen years, despite continually improving safety records, as the legal doctrine of absolute liability largely superseded negligence as a basis of damages from what used to be considered accidents or acts of God. Single-engine aircraft are aging, and the trainer market has faded to a minor fraction of its size in the 1960's and 70's. Domestic production is almost nil, although perhaps about to resume, in view of the recent limitation of product liability to a fixed term of years.

Suppliers of airplane kits for assembly by purchasers (limiting suppliers' potential liability) are enjoying modest success because of age and scarcity of the once-ubiquitous single-engine airplanes, and the high cost of those currently available. Some airplane kit manufacturers are offering factory-assembled units as well as kits, and foreign manufacturers are offering trainers and other special-use models. As noted by such authorities as Paul Poberezny, founder of the Experimental Aircraft Association, and Phil Boyer, president of the Aircraft Owners and Pilots Association, private ownership and piloting of small aircraft is being priced out of the reach of all but business firms and well-to-do individuals, who tend to buy multi-engine aircraft for presumed safety, speed, and utility.

Conventional twin-engine aircraft have critical disadvantages besides high cost, notably engine-out control characteristics that render them accident-prone because maneuvering with off-axial thrust and marginal horsepower requires greater expertise than most non-professional pilots readily achieve. Yet that disadvantage can be eliminated by mounting engines in-line fore-and-aft (i.e., tandem configuration), as proved by the CESSNA "Skymaster" Models 336/337, which—though serving with distinction in military versions—never were well accepted as civilian aircraft.

An earlier tractor/pusher aircraft was the fabled Dornier, in both commercial and military models, both land and sea craft, most notably from about World War I into the depression of the 1930's. See FLUG REVUE Oct. 1990 issue with cover illustration of Dornier's "Seastar" model; also JANE's All the World's Aircraft for numerous additional illustrations.

The Dornier Wal (whale) Do J & R amphibians supported engines in-line in a housing on a high wing spaced above the fuselage, as did various models by Caproni, an Italian maker of similar aircraft, whereas the Dornier Do X supported its dozen engines in tandem pairs on struts above the single high wing. The Cessna Skymaster mounted both engines directly on the fuselage, the pusher on a parallel axis higher and to the rear of the tractor axis (in front of the pilot).

There is an urgent need to provide a modern aircraft with twin, preferably tandem, engines capable of providing safe, inexpensive, long-range, speedy transport for a variety of general-aviation uses. My invention is intended to meet that need in a straightforward way.

SUMMARY OF THE INVENTION

A primary object of the present invention is to provide a tandem-engine propulsion module attachable to a variety of aircraft.

Another object of this invention is to provide safer multi-engine aircraft via center-line-thrust in a tandem-engine module.

A further object of the invention is to localize fuel between the engines in a tandem-engine airplane propulsion module, enabling dry-wing design and reduced off-axial mass, as well as facilitating engine fuel interconnection, cabin heating, and windscreen deicing.

Yet another object of this invention is a tandem-engine propulsion module including instrumentation and controls readily available to a flight crew, compatible with fuselage cabin pressurization and heating, and adapted to provide windscreen defrosting upon demand.

A still further object of the invention is to accomplish the foregoing objects at a cost not only affordable to a wide variety of owners and operators of non-jet aircraft but also readily profitable to companies that undertake to make and sell such aircraft.

In general, the objects of the present invention are attained by means of an aircraft propulsion module, attachable—preferably readily detachably—to an aircraft fuselage and/or wings, and having aircraft engines fore-and-aft with respective tractor and pusher propellers in substantial rotational axis alignment, and including an engine fuel compartment between (and fuel lines to) the engines.

More particularly, the various objects are accomplished by providing a self-contained tandem-engine propulsion module, detachably attaching the module in substantial contiguity to a top portion of an aircraft fuselage, and (in high-wing models) attaching wings to the propulsion module if not to directly to the fuselage.

Other objects of the present invention, together with means and methods for attaining the various objects, will become apparent from the following description and the accompanying diagrams of preferred embodiments presented here by way of example rather than limitation.

SUMMARY OF THE DRAWINGS

FIG. 2 is a front elevation of the same aircraft embodiment, exploded vertically as in FIG. 1;

FIG. 2A is a front elevation of the same embodiment, assembled in operating juxtaposition as in FIG. 1A;

FIG. 3 is a top plan view of the same aircraft with propulsion module (and wings) completely assembled according to this invention.

FIG. 4 is a side elevation of the same embodiment of propulsion module, on an enlarged scale, cut away to show part of the interior;

FIG. 5 is a top plan of the same propulsion module embodiment, scaled as in FIG. 4, also cut away to show part of the interior;

In the foregoing views propeller blades are not shown as such, but are suggested by spinner-centered circles and/or radial lines if viewed head-on, or by vertical lines if viewed sideways. Left side analogs of right-side features are indicated by like numbers primed.

DESCRIPTION OF THE INVENTION

Figures 1, 1A:
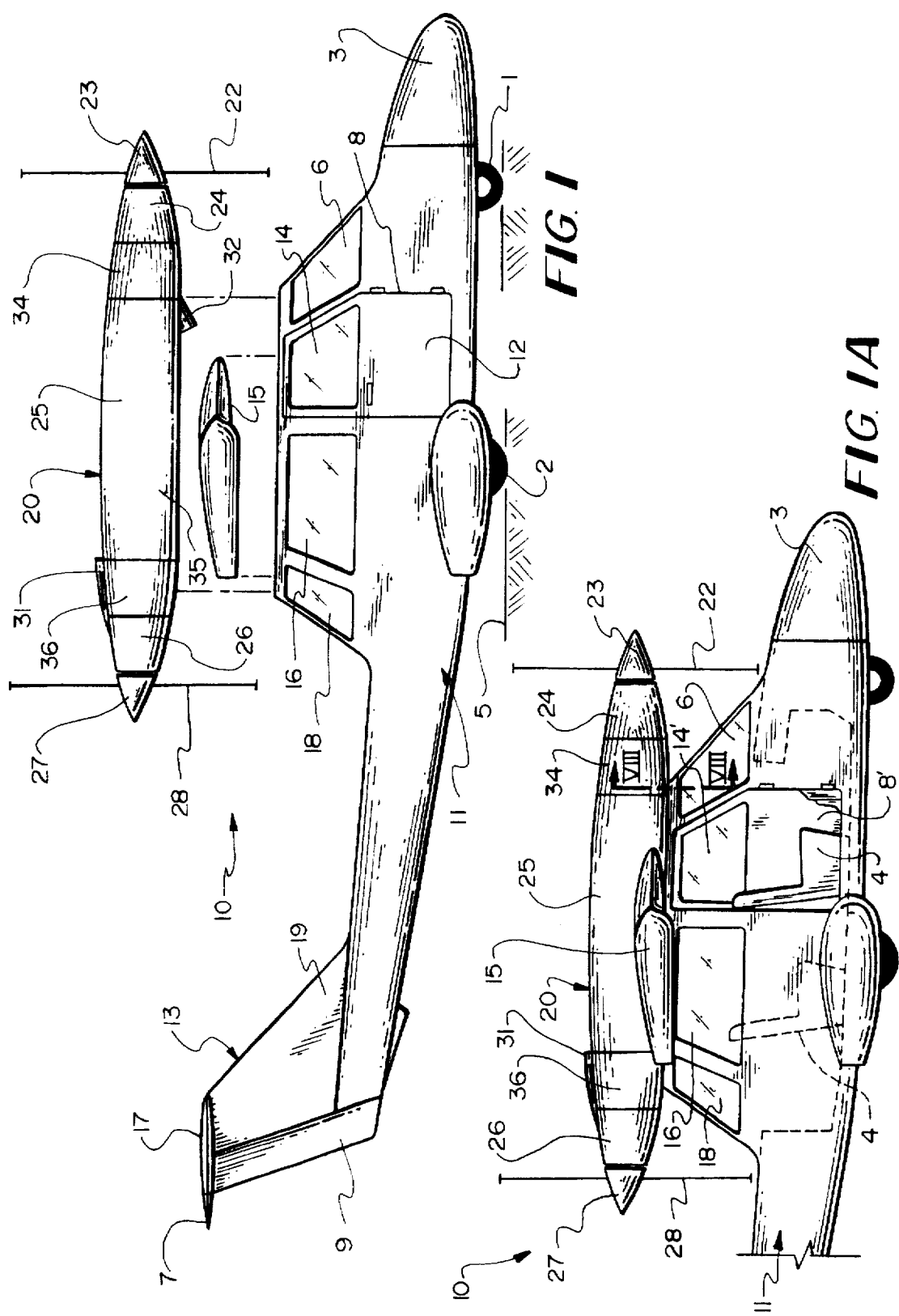
FIG. 1 is a vertically disassembled ("exploded") side elevation of an embodiment of tandem-engine fixed-wing aircraft, including a propulsion module of this invention, shown spaced above the wing(s), the wing(s) being spaced intermediately above the aircraft fuselage.
FIG. 1A is a fragmentary side elevation showing the same items from the preceding view, assembled here in operating juxtaposition.

FIGS. 1 and 2 show aircraft 10, in side and front elevations, supported on nose gear 1 and main landing gear 2, 2' on underlying surface 5—but with wing(s) 15 (15') and propulsion module 20 "exploded" vertically (dot-dash lines) from fuselage 11. FIG. 1A and FIG. 2A show the module and wings assembled to aircraft 10, and FIG. 3 shows all in plan. Module 20 is cigar-like if seen from the side (or above), a "lazy D" shape if seen head-on (or from behind).

Aircraft 10 features fuselage 11, with nose 3 furthest forward, enclosed crew cabin with door and windows in its forward half, with the propulsion module on top. The aft half terminates in empennage 13, including vertical stabilizer 19 plus rudder 9, and horizontal stabilizer 17 plus elevator 7 at the top of the vertical stabilizer.

In FIG. 1A, dotted lines are added and fuselage door 12 is cut away to show the cabin interior, and the aft half of the aircraft is omitted. Inside, the aircraft cabin accommodates two crew members (not shown) in front seat(s) 4, facing split windscreen 6, 6' and alongside door 8 (FIG. 1) with near side window 14, or (FIG. 1A) the doorway and far side window 14'. Rear seat 4' accommodates two passengers (not shown) just behind the crew alongside and between window(s) 16 (16'—not shown) and ahead of panoramic rear window 18.

Figure 8:
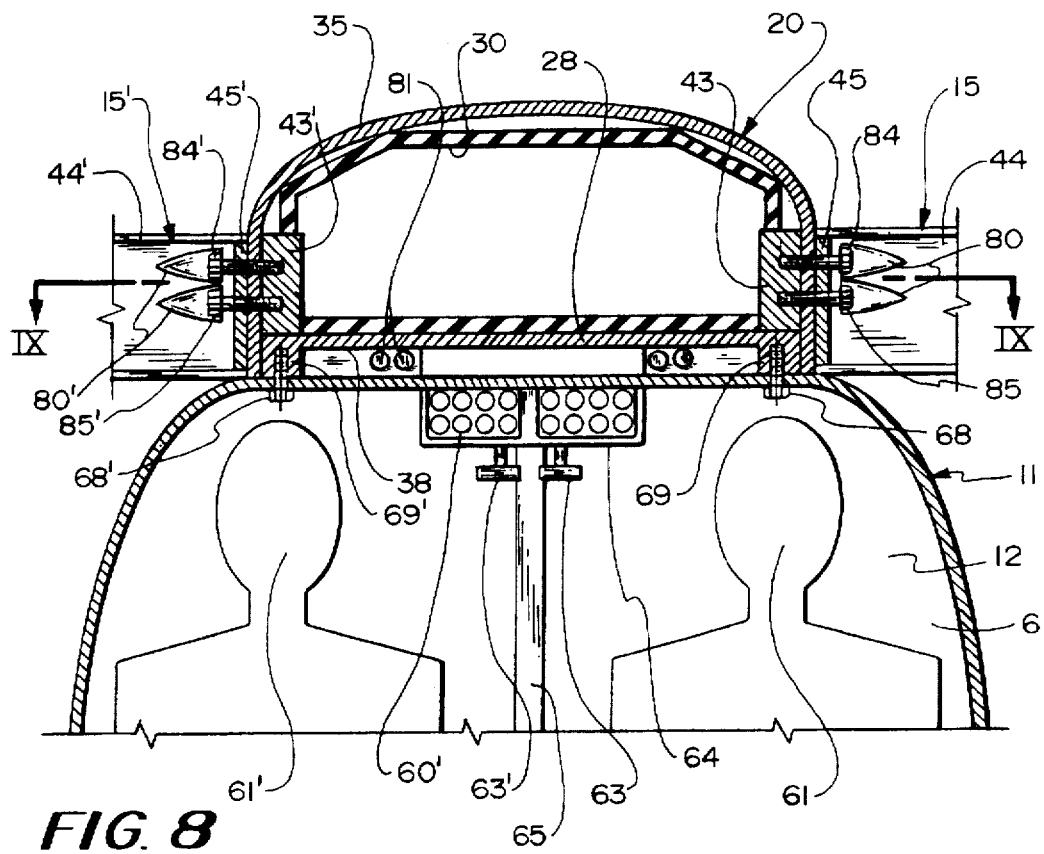
FIG. 8 is a fragmentary sectional elevation, taken at VIII—VIII in FIG. 1A, looking ahead through a forward junction of the module to the wings and a junction of the module to the fuselage cabin.

Instrumentation subhousing 32, with triangular lateral cross-section, protrudes downward from the forward underpart of the main housing of the propulsion module, as in FIG. 1, and carries flight instruments and engine controls, in position to intrude into the top of the forward part of the cabin (appropriately slotted overhead). Although hidden in the assembled view of FIG. 1A, engine instruments and controls on the subhousing panel are located in their installed position, ahead of and somewhat above the customary eye level of the crew, as shown in considerable detail in subsequent view (FIG. 8).

FIG. 3 shows flaps 74, 74' inboard, and ailerons 76, 76' out-board, along the trailing edges of wings 15, 15'. The exemplified high-wing arrangement enables direct attachment of the wing roots to the propulsion module (as shown later). Notwithstanding preference for wing-to-module attachment, high-wing attachment may be made to the fuselage directly, instead of (or in addition to) attachment to the propulsion module. Optional low-wing or mid-wing attachment in conventional manner to the fuselage may be substituted, if desired. Regardless of wing type, the propulsion module housing is preferably contiguous underneath (for most of its length) with the underlying portion of the fuselage, immediately overhead of the crew cabin. Omitted from FIG. 1 are openings in the intermediate housing portion of the propulsion module to accommodate interconnection to wing-spar structure, as diverse connection arrangements are exemplified later.

FIGS. 1 to 3 show propulsion module 20 having intermediate body housing portion 25 situated between and interconnecting the forward engine nacelle, including access cover 34 and cowl 24 beyond which spinner 23 protrudes with tractor propeller 22, and the aft engine nacelle, including access cover 36 and cowl 26 beyond which spinner 27 protrudes with pusher propeller 28. Forward cowl 24 provides an entrance for air required to cool (and preferably supercharge) the forward engine, whereas forward-facing scoop 31 (above part of intermediate housing portion 25) discharges its collected air into the rear engine compartment—via means hidden here but shown later. Centrally located access flap 21 covers the fuel compartment inlet.

FIGS. 4 and 5 show, on an enlarged scale, propulsion module 20 in side elevation and top plan, respectively, both views being cut away in part to show interior components. From forward spinner 23 about tractor propeller shaft 33 to aft spinner 27 about pusher propeller shaft 37, the exterior conforms to the foregoing views. Featured are forward cowl 24, access cover 34, intermediate housing 25 with small subhousing 32 protruding downward from its lower forward edge, aft access cover 36, and aft cowl 26, plus air-scoop 31.

Intermediate portion 25 of the propulsion module is adapted to store fuel in several symmetrically located fuel subcompartments: 30 (intermediate) with connection 75, 30' (forward) with connection 73 (and one hidden here), and 30" (aft) with connections 77 and 79, underlying manifold fuel line 39 from them to each engine. Fuel inlet or filler tube 29 is centered over intermediate subcompartment 30 and is covered by overhead access flap 21 except when being refueled. The respective forward and aft engine compartments are isolated from the intervening fuel storage by firewalls 41 and 49 and by adjacent vertical supporting plates 42 and 48 rising from horizontal main backbone member 38 of internal structural framework 40 of the propulsion module, from which all module components are supported directly or indirectly. Bosses 72 and 78 under the main frame member aid in forming a passageway for fuel line 39 as well as for instrument wiring (not shown) above underlying module skin 35.

Pair of riblike stiffener members 44 and 46, above respective bosses 72 and 78, with backbone member 38 intervening, extend from the latter to and just past the centerline (dot-dashed) of the propulsion module, then hook respectively forward and aft at ends 43, 43' and 47, 47' and are blind-bored to receive the ends of bolts from the side-recessed and end-bored stub ends of the wing-spars. Port wing 15' whose root is visible here has stub end of forward spar 64' with bolt 84' in recess 80'—and stub end of aft spar 66' with bolt 86' in like recess 80'—extending through bored side plate 45' into upper portions of respective stiffener ends 43' and 47'. Similar connecting bolts (not shown here) secure upper portions of the hooked ends of the forward and aft spars of starboard wing 15. The hidden lower end portions of each spar end are secured likewise.

Figure 6:
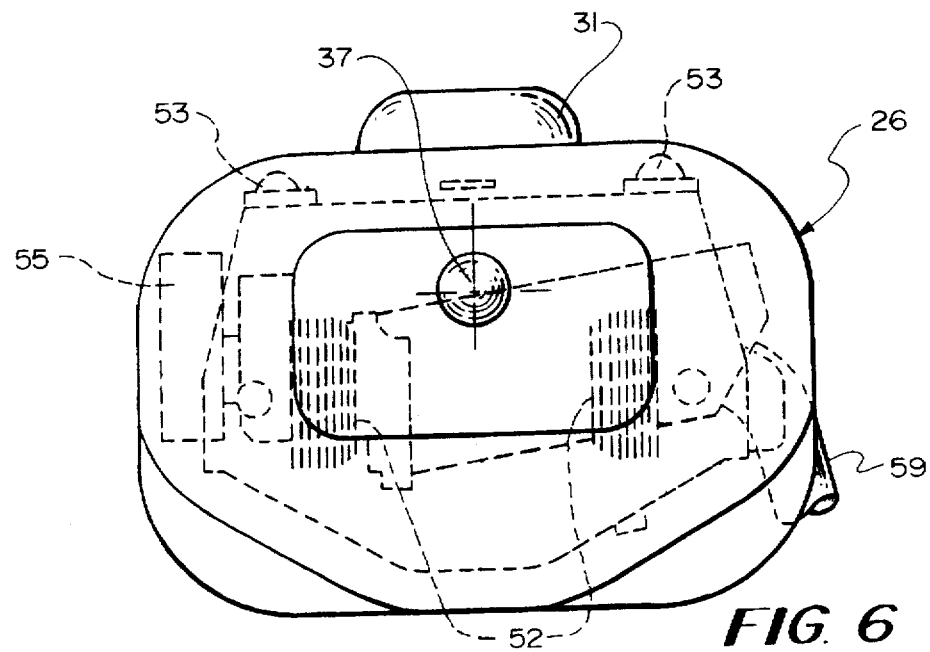
FIG. 6 is a rear elevation, further enlarged, of the aft engine nacelle, with engine features inside indicated in dashed lines.
Figure 7:
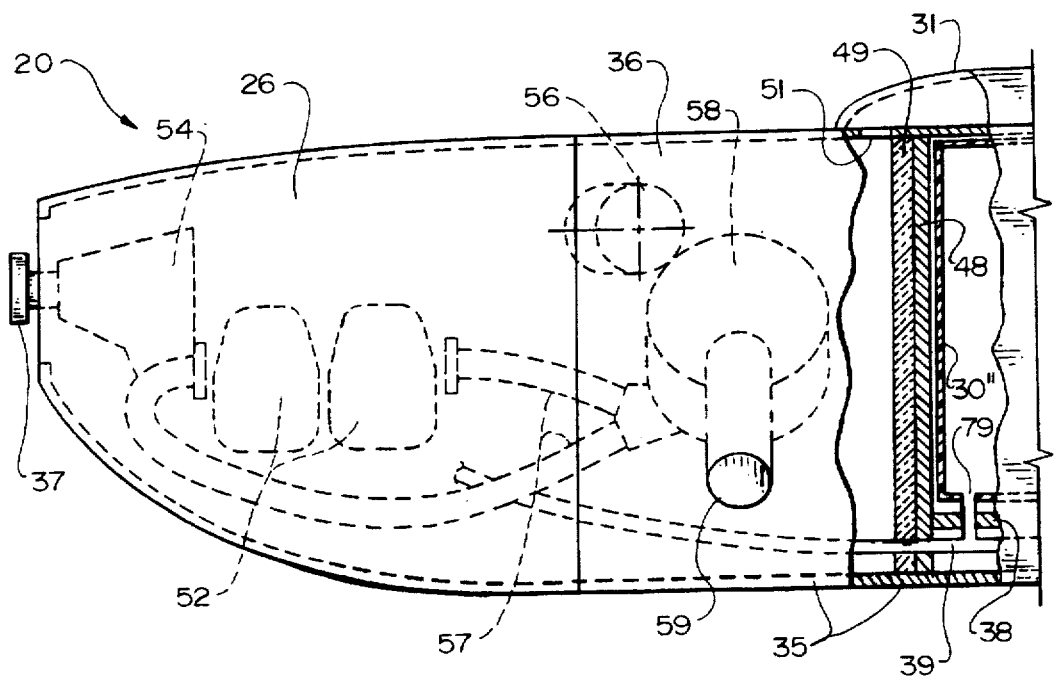
FIG. 7 is a side elevation of the FIG. 6 nacelle and vicinity.

FIGS. 6 and 7 are respectively a rear elevation, and a fragmentary side elevation (aft nacelle to intermediate housing vicinity), of propulsion module 20, with air-scoop 31 (open forward) on top, and engine components inside—indicated in broken or dashed lines. In these fragmentary views, the exemplified engines are conventional opposed four-cylinder supercharged internal-combustion engines.

FIG. 6 outlines in broken lines such engine-related features as supports 53, pair of laterally opposed cylinders 52 (finned), super-charger 55, and exhaust pipe 59. FIG. 7 shows in like manner some of the same and also related features, including pair of side-by-side cylinders 52, gearbox 54, supercharger intake 56, exhaust manifolds 57, muffler 58, and exhaust pipe 59 extending from the interior (broken lines) to the exterior (solid lines) through skin 35.

Access cover 36 and an adjacent part of propulsion module intermediate housing portion 25 are partly cut away to show some of the interior, including air inlet 51 from air-scoop 31 into the top of the engine compartment just aft of firewall 49. Fuel manifold line 39 extends from connection 79 to aft fuel subcompartment 30", into the engine compartment, via matching bores in supporting plate 48 and adjacent firewall 49—as well as extending forward out of view. The plate extends from the end of main structural member 38 to the top and bottom skin (35) just aft of intermediate housing member 25.

FIG. 8 shows fragmentarily in transverse elevation, sectioned as shown at VIII—VII in FIG. 1A, propulsion module 20 assembled not only to forward spars 64, 64' of respective wings 15, 15' but also to the cabin portion of fuselage 11. Superimposed in outline in the cabin are heads and shoulders of pair of crew members 61, 61' facing pair of windscreen panes 6, 6' (with center divider 65). Intruding downward into the top part of the cabin through an overhead slot (not visible) is propulsion module subhousing 32, positioning engine instrumentation dials 60 on a subpanel conveniently centered just above and beside the crew's line of sight, with unitary engine controls 63, 63' readily at hand— each a stand-in for the usual separate manual controls for engine throttle, fuel mixture, and/or propeller pitch. Cable connectors 81 are available (via the overhead slot) to the module passageway underneath main frame member 8.

FIG. 8 also shows the junction of propulsion module 20 atop the cabin of fuselage 11 by bolts 68, 68' extending through the cabin overhead into knobs 69, 69' on the underside of framework backbone member 38. It will be understood that similar interconnections, at suitable intervals over the length of the cabin and the intermediate part of the module, retain the module securely to the fuselage.

Also shown is junction of the propulsion module to bored stub ends of forward wing spars 64, 64' by upper bolts 84, 84' and lower bolts 85, 85' (heads in spar recesses 80, 80') via bored side plates 45, 45' and module skin 35 into blind bores in upper and lower portions of hooked ends 43, 43' of forward stiffener 44. It will be understood from this FIG. 8 and prior FIG. 5 that each wing spar is secured in like manner by both an upper bolt and a lower bolt, both forward and aft, retaining each wing rigidly to the propulsion module by four bolts—a rectangular pattern as viewed from the side.

Figure 9:
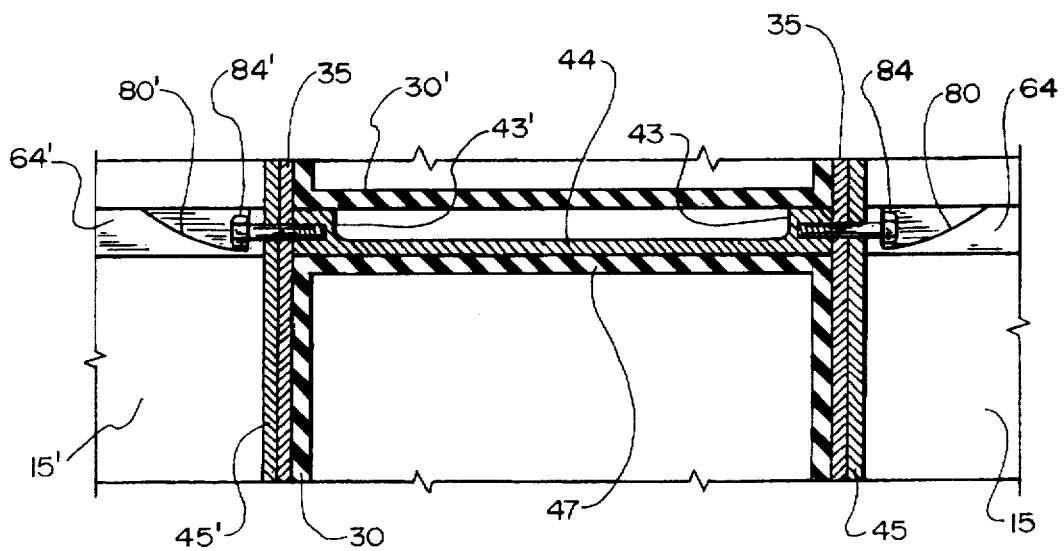
FIG. 9 is a fragmentary sectional plan within the propulsion module and the wings, taken along IX—IX in FIG. 8.

FIG. 9 shows further, in fragmentary transverse sectional plan (taken at IX—IX in FIG. 8), the junction of the engine propulsion module to the wings. The lower forward stub ends of wings 15, 15' are secured by bolts 85, 85' whose heads fit into side recesses 80, 80' and whose threaded ends fit through bores in the stub ends, side plates 45, 45', and propulsion module skin 35 into blind bores in hooked ends 43, 43' of forward stiffener 44. The aft half of the propulsion module duplicates this arrangement to complete the noted rectangular arrangement of wing retention, as will be readily understood without further illustration. Also, the housing of the propulsion module is provided with added small access covers (not shown) to enable the spar bolts to be reached for inspection and tightening or removal for temporary disassembly, permanent replacement, etc.

Figure 10:
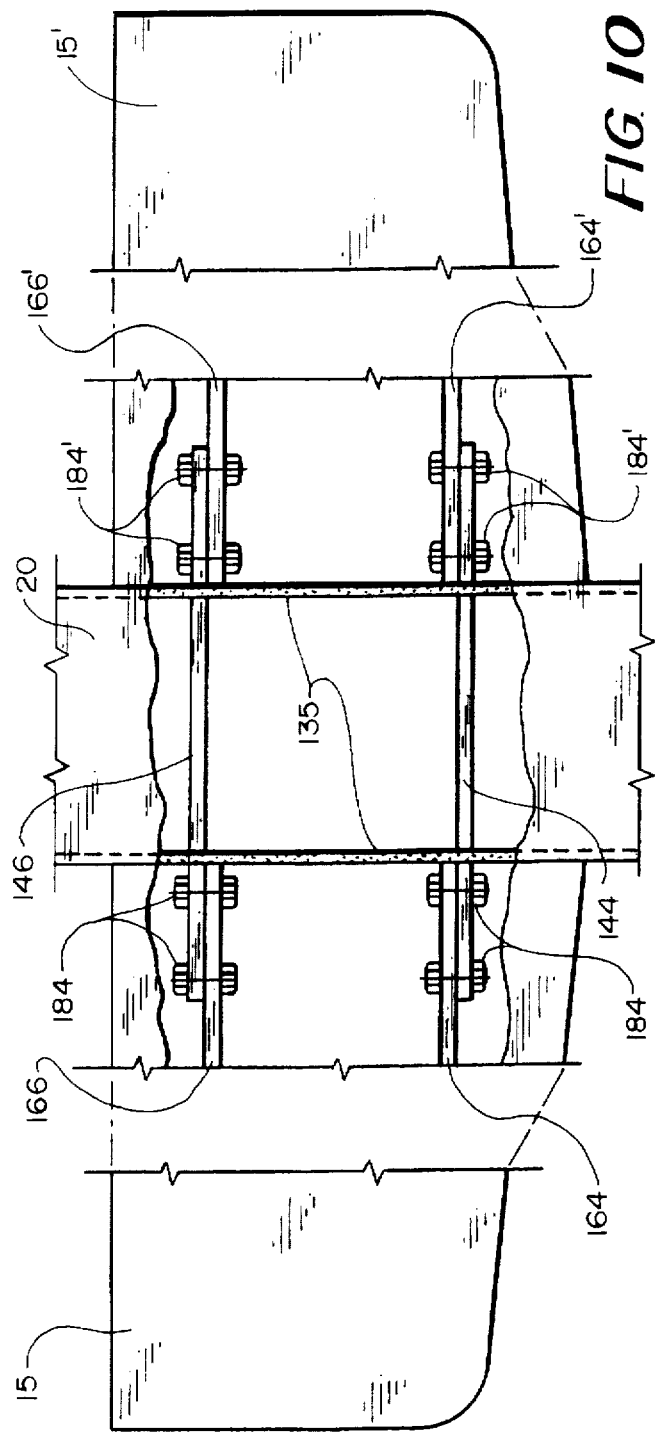
FIG. 10 is a fragmentary sectional plan of the junction of the propulsion module and wings, alternative to that of FIG. 9.
Figure 11:
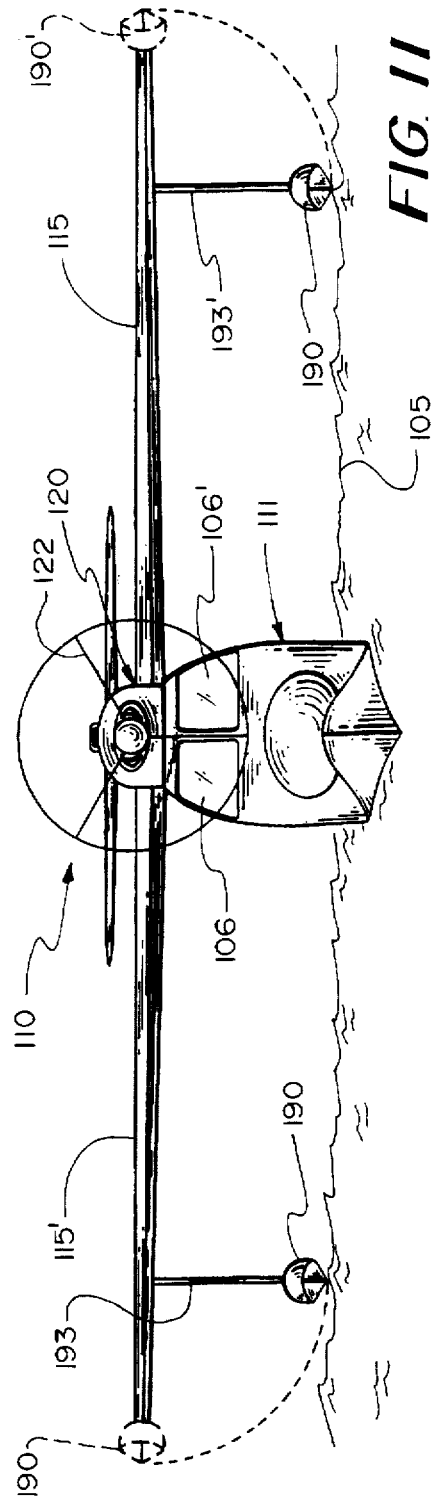
FIG. 11 is a front elevation of a flying boat type of seaplane embodying a similar propulsion module of this invention.

FIGS. 10 and 11 show alternative embodiments of this invention, especially as to wing spar retention means and undercarriage means. In each of these views, components similar to those of the previous embodiment are identified by like reference numerals plus one hundred, e.g., propulsion module 120. It should be understood that the alternatives in either of these views may be substituted for the corresponding embodiments of prior views, as well as used together.

FIG. 10 shows in top plan an alternative embodiment of wing spar assembly to propulsion module 120, wherein the module stiffener members have lateral extensions instead of hooked ends, and overlap the respective wing spars instead of abutting wing spar stub ends. Forward stiffener 144 member extends laterally to overlap forward spars 164, 164' of respective starboard and port wing 15, 15', and aft stiffener 146 extends laterally to overlap aft spars 166, 166'. The forward stiffener securely retains the forward wing spars via pairs of inboard and outboard bolts 184 (starboard) and 184' (port); and identical pairs of inboard and outboard bolts 184, 184' securely retain the aft wing spars to the aft stiffener. The bolts render the wings readily detachable as and when desired. Additional bolts may be provided alongside and/or underneath those shown, if desired. Moreover, at each side a bolt in each spar and stiffener combination may be converted to a pivot pin, to enable the wings to fold upward (carrier-wise) for compact storage and/or transport. Junction of the propulsion module to the fuselage is not shown here, as it may conform to the previous embodiment or to an equivalent arrangement.

FIG. 11 shows seaplane 110 according to this invention, wherein similarity of features to landplane 10 shown in FIGS. 1 to 9 is so great that corresponding parts need not be named nor their reference numbers (differing by 100) be recited here. Differences appear here in the three-blade propellers, forward propeller 122 being visible, also hull 111, and outriggers 190, 190'—floating in water 105 at the bottom ends of supports 193, 193' deployed from respective wings 115, 115'. Alternative raised (flight) position of the outriggers and floats, aligned with the wings, is indicated in broken lines.

The propulsion module of this invention does not require any unusual materials or methods of construction. Desired lightness of weight militates in favor of aluminum and/or composites, but steel can be substituted in the stiffeners of the propulsion module, not only for reinforcing it but also for providing stronger attachment to the fuselage and also in the wings when of high-wing type. Using state-of-the-art composite materials facilitates construction of aircraft fuselages and facilitates cabin pressurization—while providing additional safety margin relative to terrain and weather.

The fore-and-aft and side-to-side symmetries of the propulsion module enable standard weight-and-balance considerations to be met readily enough, as by locating the center of mass of the module substantially directly above the center of mass of the fuselage.

The propulsion module may be fitted with such engines as are used in comparable aircraft. New engines are becoming available, in addition to those already proven suitable in comparable aircraft. An example of the indicated four cylinder opposed-cylinder engine is RETAX Model 914 manufactured by Bombardier-Retax Gmbh Motorenfabrik. Each engine compartment normally will carry a battery (not shown).

The tandem engine propulsion module of this invention provides many advantages and benefits, some of them already mentioned, such as the enhancement of safety by the in-line location of engines and propellers, thereby eliminating off-axial thrust, reducing drag, and substantially eliminating related spins or other loss of control. Both propellers are clearly visible to enable the crew to monitor their operation at all times. The combined fuel subcompartments eliminate fuel-tank-switching errors and enable dry-wing simplicity and economy. Engine instruments and controls originate in the module and are presented to the crew on a panel depending from it, or may be presented on a conventional panel fed by overhead cables from the module. Fuselage design and selection are independent of the module except for means of interconnecting module and fuselage, and admission of the instrumentation into the cabin from overhead.

The overhead mounting of the propulsion module assures wing-tip clearance, which may be enhanced by selection of three-blade instead of two-blade propellers, as indicated in the seaplane example.

Turn-around time for routine maintenance and/or engine overhaul can be shortened drastically by interchanging propulsion modules. Conventionally maintenance or repair of an individual engine or any other component, much less replacing one or more engines, renders an aircraft inactive until complete repair or replacement, including all reconnections and check-out can be accomplished. In contrast, one-day turn-around time for propulsion modules of this invention can be achieved readily by simple interchange with a spare module.

Adoption of integrated propulsion modules for aircraft not only enhances safety directly but also promotes standardization of engine controls and instrumentation and consequent reduction in cockpit confusion, further promoting reduced insurance charges and flying cost.

The tandem-engine principle embodied in this propulsion module is not present in the marketplace and, as defined herein, has never been known or used anywhere in war or peace. It is suited to small, medium, or large aircraft, carrying one-person or many hundreds. It provides safety, economy, and convenience that alternative designs cannot provide, whether at comparable or indeed almost any cost. It is especially conducive to supercharging of the engines and optional pressurization of the cabin for increased flight efficiency and for freedom from the risk of oxygen deficit at higher altitudes, also reducing the number of takeoffs and landings, as for refueling or for rest. Sealing the slot admitting the instrumentation subhousing into the fuselage overhead is readily accomplished during assembly.

The propulsion module of this invention, besides eliminating accident-inducing off-axial thrust for true multi-engine safety, also by its single fuel feed eliminates the need for tank-switching and thus eradicates the hazard of selecting an empty fuel tank.

This invention fosters lower insurance costs by reason of its safety features, simplified fuselage structure and wing structure free of engine mounting and fuel interconnections, and even offers the additional benefit of fixed-gear simplicity if and when desired.

This propulsion module is within the skill of a wide variety of artisans to produce, and could also be provided in kit form to enthusiasts for assembly, perhaps largely pre-assembled whenever other kit components approximate the requirements for self-assembly.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

The claimed invention:

1. Tandem-engine propulsion module, comprising a housing with only two engines, respectively fore-and-aft in the housing, a fuel compartment centered fore-and-aft in the housing, and engine instruments and controls;

adapted to be installed as the only propulsion means for a fixed-wing aircraft having fuselage means extending fore-and-aft, including a forward cabin portion for a flight crew, with the engine instruments and controls accessible to the flight crew.

2. Tandem-engine propulsion module according to claim 1, wherein the fuselage means and the wing means exclude any fuel compartment.

3. Powered dry-wing aircraft, comprising, in combination, boatlike fuselage means extending fore and aft along and about a substantially horizontal centerline;

wing means extending substantially horizontally and laterally outboard relative to the fuselage means, and secured thereto;

outboard stabilization means depending from the wing means and flanking the fuselage means; and a tandem-engine propulsion module in part contiguous with and detachably secured to at least one of the foregoing means, the propulsion module being adapted to rotate a tractor propeller and a pusher propeller located respectively forward and aft of the leading and trailing edges of the wing means.

4. Method of powering a fixed-wing aircraft provided with enclosed fuselage means extending fore-and-aft including a crew cabin and having single-wing means extending outboard therefrom in opposite lateral directions, comprising the steps of providing a propulsion module detachably attachable to the fuselage means proximate to inboard portions of the wing means and adapted to carry forward and aft engine means;

providing an engine fuel compartment in the propulsion module, centering the engine fuel compartment in plan laterally relative to the fuselage means and fore-and-aft relative to the wing means; and detachably attaching the propulsion module in substantial contiguity to an upper portion of the fuselage means.

* * * * *